106-89

655,007

United States Patent Office 3,503,767
Patented Mar. 31, 1970

3,503,767
CEMENTITIOUS COMPOSITIONS HAVING INHIBITED SHRINKAGE AND METHOD FOR PRODUCING SAME
Robert W. Gaines, Darien, and Henry Nash Babcock, Old Greenwich, Conn., assignors to U.S. Grout Corporation, Old Greenwich, Conn., a corporation of Connecticut
No Drawing. Filed July 21, 1967, Ser. No. 655,007
Int. Cl. C04b 7/02, 7/12
U.S. Cl. 106—89   10 Claims

ABSTRACT OF THE DISCLOSURE

The shrinkage of aqueous hydraulic cement mixtures is eliminated by incorporating therein a fluid coke with a particle size predominately finer than 100 mesh. The amount of fluid coke that may be used to eliminate the shrinkage is less than 10% based on the weight of the cement in the mixture.

BACKGROUND OF THE INVENTION

Field of the invention

This invention relates to improvements in aqueous hydraulic cement mixtures such as concrete, mortar, grout and products made from them, architectural stone, concrete block, terrazzo, concrete pipe, asbesto-cement, and the like. More particularly, it relates to an improved method and means for inhibiting shrinkage of such mixtures during setting and early hardening.

The term "hydraulic cement" as used herein, is intended to include any cement which has the charactaristic of hardening under water, e.g., Portland cement, blends of Portland cement and natural cement, air-entraining Portland cement, pozzolanic cements, slag cement, aluminuous cement, masonry cement, oil well cement, white Portland cement, colored cement, anti-bacteria cement, waterproofed cement, hydraulic lime, a mixture of Portland cement and blast-furnace cement, and like materials.

The term "concrete" is used to designate a mixture of hydraulic cement, aggregate and water, which sets to form a hard mass. Concrete may contain either mineral or non-mineral aggregate, including naturally occurring materials, for instance, sand and gravel or quarried rock, or manufactured aggregate such as expanded shale, clay, or the like.

The term "mortar" is used herein to designate a mixture of hydraulic cement, fine aggregate and water, and the term "grout" designates a mixture of hydraulic cement and water, and sometimes fine sands. Grouts normally have higher fluidity than mortars and can be pumped through pipe lines and forced into small spaces, for instance, into voids or cracks or porous concrete, or into spaces between preplaced aggregate.

Description of the prior art

It has previously been suggested to include in aqueous hydraulic cement mixtures various expansion agents which will cause the concrete to expand during setting and early hardening. They are generally admixtures which are added at the mixing during the preparation of the cement mixture. Perhaps, the most commonly known expansion agents are aluminum powder and iron filings.

Metallic aluminum powder, when added to a concrete mix, causes the liberation of hydrogen gas within the concrete mass. The rate at which this gas is liberated is a function of the powder used, the particle size of the powder and the composition of the cement, particularly the alkali content. To prepare a non-shrinking concrete, a careful balancing of the amount of the aluminum to be used, hence the amount of the hydrogen to be released, with the anticipated shrinkage of the mass is required, and very careful control at all stages of concrete preparation is essential to yield the desired result. The use of aluminum powder to prevent shrinkage is, therefore, impractical under field conditions that require accurately weighing a very small amount of the metal by, most likely, unskilled laborers.

Iron filings have been used as an admixture to a Portland cement grout. Minor expansion due to oxidation follows after the grout has set, to a sufficient extent, at least, to offset the natural shrinkage inherent in the concrete grout. The use of iron filings, however, has many shortcomings. Chiefly among them is the lack of control due to the continuing oxidation of the iron long after the desired effect has been achieved which is particularly true if the concrete involved is directly exposed to outside weather conditions. Furthermore, using iron filings, temporary shrinkage occurs before sufficient rust can be formed to initiate the internal expansion and to offset some of the shrinkage.

More recently, fluid coke has been found to be effective for eliminating the shrinkage of aqueous hydraulic cement mixtures which represents a notable advance in the art. Heretofore, a relatively large amount of fluid coke, generally over 10% by weight of the cement, had to be used in order to achieve the desirable non-shrinking result. The requirement for a large volume of fluid coke in a non-shrinking cementitious system not only detracts from the appearance of the final products, but also the high cost resulting from the large amount of fluid coke additive renders the cement mixture economically unattractive for many commercial applications despite the many inherent advantages in a non-shinking cementitious system. The relatively large amount of fluid coke that has to be incorporated in the cement mixture also presents material handling problems. The cement industry is equipped with material handling equipment with capacities based on a fixed weight basis, e.g., 94 pounds per sack and 376 pounds per barrel, etc., and is not readily adapted to operate on a new weight basis in excess of 10% without substantially changing the requirements and specifications of the construction and other cement-using industries. The requirement for changing the material handling procedures, hence some of the equipment, may indeed be a major obstacle for the commercial acceptance of the non-shrinkage cementitious system.

SUMMARY OF THE INVENTION

We have now discovered that the amount of fluid coke required to eliminate the shrinkage of the concrete mass can be drastically reduced if the particle size of the fluid coke is predominately finer than 100 mesh. According to the present invention, the shrinkage of an aqueous hydraulic cement mixture during setting and early hardening can be effectively inhibited by incorporating in the cement mixture less than 10% by weight, based on the cement in the mixture, of an admixture containing essentially fluid coke having a particle size predominately finer than 100 mesh.

The resultant aqueous hydraulic cement mixture of the present invention has better workability, e.g., it requires 5% to 10% less water, and the product prepared therefrom has greater strength than a comparable prior art fluid coke cementitious system. Because of the better workability and higher strength of the product, the cement mixture of this invention requires essentially less cement. Furthermore, by carefully controlling the particle size in the fluid coke, the amount of expansion and contraction of a cementitious system can be much more effectively regulated by the method of this invention. The product prepared from the cement mixture of this invention shows remarkable salt water freeze-thaw resistance, and superior bonding and pull-out strengths. These unique properties in combination with the non-shrinking characteristic and yet without the inherent disadvantages of the prior art fluid coke-cementitious system render the cementitious system of this invention particularly attractive to construction and other related cement-using industries.

DESCRIPTION OF THE PREFERRED EMBODIMENTS

The fluid coke suitable for the present invention is a by-product of the fluid coking process for the thermal conversion of heavy hydrocarbon oils to lighter fractions. The fluid coke part of the process generally uses a fluidized bed reactor in combination with a burner vessel. The seed coke which is used as a catalyst in the fluidized bed reactor is initially heated in the burner vessel and is then fed into the reactor where the coke comes in contact with the raw preheated feed stock. The feed stock, upon contact with the coke particles, is partially cracked and the lighter fractions are flashed off. Additional coke is formed both as seed coke and in the growth of the heated coke particles coming from the burner vessel. The new coke is deposited on the seed coke. The excess coke thus formed in the reactor is tapped off and quenched. The fluid coke recovered is in a hard substantially spherical form.

The particle size of fluid coke varies within a wide range depending on the specific fluid coking process. Typical screen analyses of several samples were found to be as follows:

TABLE I.—SIEVE ANALYSIS, U.S. SCREEN CUMULATIVE, WT. PERCENT RETAINED

| Mesh | Samples | | | | | |
|---|---|---|---|---|---|---|
| | 1 | 2 | 3 | 4 | 5 | 6 |
| 10 | | 9.7 | | | | [2]3 |
| 20 | | 11.8 | 4.9 | 2 | | 4 |
| 30 | 1.2 | | | 5 | | 4 |
| 40 | | 20.6 | | 11 | | 6 |
| 50 | 87.3 | | | [1]20 | | 15 |
| 60 | | | 45.8 | | | |
| 70 | | 58.1 | | | 70 | |
| 80 | | | 72.0 | 44 | | 44.8 |
| 90 | | | | | | |
| 100 | 95.1 | 89.3 | 85.8 | 65 | 88 | 62.9 |
| 200 | | 99.4 | 97.2 | 95 | 93 | 96.6 |
| Pan | | Balance | | | | |

[1] 8 mesh. [2] 48 mesh.

The chemical analysis of the coke generally shows about 90% carbon but the ash in crude feed stock will, of course, determine the chemical analysis of the ash of the coke, so wide variations are to be expected. The ash content, however, is very low and usually is less than about 0.5%.

While the coke produced in the fluid coking process can be used directly for controlling the shrinkage of the cementitious system during setting and early hardening, the amount of such fluid coke required for the controlled shrinkage normally requires in excess of 10% by weight of the cement in the system. We have now found to our surprise that the amount of fluid coke required to control the shrinkage of a cementitious system can be greatly reduced if the particle size of the fluid coke is predominately less than 100 mesh, preferably in the range between 100 mesh and 200 mesh. The use of the finely divided fluid coke is particularly effective when the moisture of the fluid coke is artificially reduced to less than 3% by weight of the coke in accordance with a process described in U.S. patent application Ser. No. 640,408, filed May 22, 1967. To practice the present invention, the size of the fluid coke is preferably ground to below 100 mesh and preferably retained at 325 mesh by any conventional grinding means. Subsequent to grinding, the fluid coke is dried to below about 3% to remove substantially all the moisture therein. The drying temperature can be varied. It should not, however, be so high as to cause excessive combustion of the coke particles. After essentially all the moisture is removed, it is important that the resultant dried fluid coke is allowed to cool in dry air for a period sufficiently long thereby allowing the dried coke particles to establish essentially an equilibrium with the ambient conditions. It has been found that the expansion activity of the fluid coke when used immediately after it is dried is drastically reduced as compared with the fluid coke which is allowed to cool to ambient temperature prior to its application as an admixture in the cementitious system according to the present invention.

When cooling the dried fluid coke under normal low humidity conditions, e.g., 70°–80° F. and 10%–30% relative humidity, the coke regains less than about 1% by weight of volatilizable substance which is predominately air and possibly a small amount of water. It is, therefore, not necessary to take special precaution for cooling the dried fluid coke under normal drying-plant conditions where the ambient humidity is reasonably low. However, in hot and humid conditions, special precaution must be taken during the cooling of the fluid coke. In the laboratory experiments, it was found that the amount of moisture that can be reabsorbed by dried fluid coke during cooling can exceed 9% by weight for a 24-hour period under conditions near 100% relative humidity and at about 90° F. Under these, or even less severe conditions, it is advantageous to cool the dried fluid coke in a space wherein the humidity is extremely low or readily controllable so that the resultant moisture content of the fluid coke is less than 3% and preferably less than about 1% by weight.

The ground fluid coke after the drying treatment is now ready to be used as an admixture for any cementitious system for inhibiting shrinkage thereof. The fluid coke is extremely active and will prevent shrinkage as soon as the cement mixture is mixed with water. The expansion activity will continue for a period to offset the shrinkage of the concrete mass due to setting and evaporation of water.

As mentioned hereinabove, the optimum expansion activity of the fluid coke in a cementitious system is realized when its particle sizes are predominately finer than 100 mesh. The expansion activity appears to improve with increasingly finer coke particles and, at the same time, the rate of expansion also appears to be increased. In other words, the time required for the cementitious system to realize the full expansion activity of the fluid coke decreases. Thus, the finer the coke particle size, the higher the expansion activity until the particles of the coke reach a size, generally finer than 325 mesh, that the rate of expansion becomes so rapid that the setting cementitious material is not sufficiently hardened to capture a portion of the released gases from the fluid coke resulting in a net expansion of the cementitious system less than those of coarser particles, such as fluid coke in the 100 to 200 mesh range. The early release of a comparatively larger quantity of gases by the extremely fine fluid coke, i.e., finer than 325 mesh, however, has an air entrainment effect on the cementitious system and can be advantageously utilized.

The contrasting properties of the fluid coke thus can be utilized advantageously, as will be readily appreciated by those skilled in the art, by selecting fluid coke of proper particle size of a mixture of different sizes to counteract the shrinkage of a particular cementitious system in accordance with its setting rate and shrinkage characteristics. It can also be used in certain instances to alter other physical characteristics of the cementitious system due to the effect similar to limited air entrainment.

Accordingly, the amount of the admixture of this invention to be used depends on particle sizes and the particle distribution, the shrinkage and setting characteristics of the particular cementitious system, and also to a large extent, the amount of evaporation that will take place. In general, the amount of fluid coke admixture of this invention required for controlling the shrinkage of a cementitious system setting with a "normal amount of evaporation" is less than 10% by weight of the cement. The term "normal amount of evaporation" stated hereinabove refers to the amount of water evaporated at the first 3½ hours during setting and early hardening of the concrete mass at ambient conditions of 70°–80° F. and 10%–30% relative humidity. The amount of water evaporated under laboratory conditions stated above is less than 0.5% of the total weight of the aqueous hydraulic cementitious mixture. In actual practice, the amount of fluid coke used may be much less than 10% if the particle size of the coke is in the range of 100–200 mesh and the moisture content of the fluid coke is below the range of 1%.

Under "no evaporation" condition, which is recommended for setting almost all types of cement mixtures but is seldom practiced or completely realized in the actual field conditions, further reduction of the amount of admixture to be used can be realized. (In the laboratory, the "no evaporation" condition is achieved by setting the cement mixture under a thin layer of water.) Thus, in a cementitious system of the following composition:

|  | Grams |
|---|---|
| Type I cement | 146 |
| Sand | 293 |
| Water | 50 | the amount of dried fluid coke which has a particle size predominately less than 100 mesh and contains 0.89% of volatilizable substance (possibly predominately air) required to eliminate shrinkage is about 2% by weight of the cement.

In carrying out the method of this invention, the proper amount of dried fluid coke admixture may be added to and mixed with cement or any type of cement mixture at any time prior to or during the addition of water to form aqueous cement mixtures. For example, in preparing grout or mortar, the fluid coke may be mixed with cement or cement and fine aggregates to form a dry cement mixture which is subsequently mixed with the desired amount of water to form grout or mortar. Similarly, in preparing ready-mixed concrete, the fluid coke may be mixed with the cement and aggregates to form a dry mixture which is then used to form the ready-mixed concrete either in a stationary or in a truck mixer. On the other hand, it may be advantageous to mix all the ingredients, including the fluid coke admixture in the stationary and/or in the truck mixer to form the ready-mixed concrete.

Since the amount of fluid coke to be used in any cementitious system can be best calculated based on the amount of cement in the system, it is advantageous to incorporate the fluid coke directly in the cement prior to its shipment to the user. Adding fluid coke to the cement directly in the latter's manufacturing plant has the added advantage of utilizing some of its equipment and waste heat for grinding and drying the fluid coke, respectively.

Further to illustrate this invention, specific examples are described hereinbelow. In these examples, the performance of the fluid coke admixture was judged by the expansion and contraction of the cementitious system as soon as it was mixed with water and cast in a cylindrical mold with approximately 10% of exposed surface. The expansion and contraction of the cast was determined by the vertical movement of the top surface. For the purpose of higher accuracy, a light test was used to measure the movement of the top surface. The test consists of using a focused light beam to project a shadow of the top surface onto a screen equipped with a vertical graduation. The magnification is 72 times. The movement of the top surface on the screen is recorded in every 10 to 20 minutes for each cast until final set which usually takes about 3 to 4 hours.

A thin layer of water was added to the mold for setting the cementitious system under "no evaporation" condition. To facilitate the detection of the movement of the top surface, a plastic marble with a specific gravity slightly heavier than water was placed on top of the surface, and the expansion or contraction of the cast was determined by the movement of the apex of the shadow projected on the screen.

TABLE II

|  | Grams |
|---|---|
| Type I cement | 389 |
| Fluid coke (4% by weight of cement) | 15.6 |
| Water | 111 |

The water cement ratio is 3.2 gallons per sack. All the fluid coke has been either preground or presieved to a particular sieve size.

In the following table, vertical expansion values at 72 magnification are given per four inch high cylinders at 16 to 20 hours' age.

TABLE III

| Sieve size | Light test (growth after 4 hours) | |
|---|---|---|
|  | Ground fluid coke | Sieved fluid coke |
| 30–50 |  | 3.6″ |
| 50–100 |  | 4.5″ |
| 100–200 | 7.0″, 7.2″ | 6.1″ |
| 200-pan |  | 8.1″ |
| 200–325 | 8.4″ |  |

Two values for ground coke in the 100–200 mesh range represent separate tests. In the absence of coke, a shrinkage of 1.5 inches occurred. All tests were performed in a manner to minimize the effect of evaporation. Water was added dropwise to the top surface to keep it moist.

We claim:

1. A method for inhibiting the shrinkage of an aqueous hydraulic cement mixture during setting and early hardening which comprises incorporating in the cement mixture an effective amount less than 10% by weight, based on the cement in the mixture, of an admixture consisting essentially of fluid coke having a particle size predominately finer than 100 mesh.

2. A method according to claim 1 wherein the admixture is dispersed in the hydraulic cement prior to mixing the hydraulic cement with water.

3. A method according to claim 1 wherein the admixture is incorporated in the aqueous hydraulic cement mixture at the point of or at a predetermined period before the mixing of the hydraulic cement with water.

4. A method according to claim 1 wherein the particles of the fluid coke are in the range between 100 mesh and 325 mesh.

5. A method according to claim 4 and further characterized in that the fluid coke is ground to a particle size in the range between 100 and 200 mesh.

6. A method for inhibiting the shrinkage of an aqueous hydraulic cement mixture during setting and early hardening which comprises incorporating in the cement mixture a small percentage of an admixture consisting essentially of fluid coke having a particle size in the range between 100 and 325 mesh, the amount of the admixture being sufficient to eliminate the shrinkage due to the chemical action of the cement and the evaporation of water during setting and early hardening.

7. A cementitious composition which when mixed with water is capable of setting into a hard mass with inhibited shrinkage during setting and early hardening, said composition comprising a hydraulic cement mixture and an admixture consisting essentially of fluid coke having a particle size predominately finer than 100 mesh, the amount of the admixture being an effective amount less than 10% by weight of the cement in the hydraulic cement mixture.

8. A cementitious composition of claim 7 wherein the hydraulic cement mixture comprises Portland cement and concrete aggregate, and the amount of the admixture is in the range between 2% and 10%.

9. A cementitious composition of claim 7 wherein the hydraulic cement mixture comprises Portland cement and concrete aggregate, and the admixture has particles with sizes predominately between 100 and 325 mesh.

10. A cementitious composition which when mixed with water is capable of setting into a hard mass with inhibited shrinkage during setting and early hardening, said composition comprising a hydraulic cement mixture and an admixture consisting essentially of fluid coke having different particle sizes that are predominately finer than 100 mesh and having a particle size distribution in proportion to the particle size distribution of the cementitious mixture and the amount of said admixture being an effective amount less than 10% by weight of the cement in the hydraulic cement mixture.

References Cited

UNITED STATES PATENTS

| | | | |
|---|---|---|---|
| 169,218 | 8/1875 | Whittemore | 106—97 |
| 1,519,286 | 12/1924 | Winkler | 106—97 |
| 1,772,149 | 8/1930 | Jolitz | 106—95 |
| 3,234,035 | 2/1966 | Small et al. | 106—89 |
| 3,376,146 | 4/1968 | Mitchell | 106—97 |
| 3,414,504 | 12/1968 | Oldweiler | 208—53 |

TOBIAS E. LEVOW, Primary Examiner

W. T. SCOTT, Assistant Examiner

U.S. Cl. X.R.

106—97, 314